US006933651B2

(12) United States Patent
Someya et al.

(10) Patent No.: US 6,933,651 B2
(45) Date of Patent: Aug. 23, 2005

(54) COMMUTATING DEVICE FOR SMALL-SIZED MOTOR AND MANUFACTURING METHOD THEREFOR

(75) Inventors: Ryouichi Someya, Matsudo (JP); Tsukasa Tsuchimochi, Matsudo (JP); Junichi Kojima, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 0 days.

(21) Appl. No.: 10/875,115

(22) Filed: Jun. 23, 2004

(65) Prior Publication Data

US 2005/0006976 A1 Jan. 13, 2005

(30) Foreign Application Priority Data

Jul. 11, 2003 (JP) ....................................... 2003-273370
Mar. 19, 2004 (JP) ....................................... 2004-080253

(51) Int. Cl.[7] ................................................ H02K 13/00
(52) U.S. Cl. ........................ 310/248; 310/251; 310/252
(58) Field of Search .................................. 310/248–253

(56) References Cited

U.S. PATENT DOCUMENTS 3,617,785 A * 11/1971 Kristiansen ................. 310/236
4,103,196 A * 7/1978 Saito et al. ................. 310/266
4,163,916 A * 8/1979 Kobayashi .................. 310/246
4,283,841 A 8/1981 Kamiyama ................... 29/597
4,415,635 A * 11/1983 Wilsdorf et al. ............ 428/611
4,769,566 A * 9/1988 Matsuda ............... 310/40 MM
5,281,176 A 1/1994 Yahagi et al. ............... 439/887
5,777,405 A 7/1998 Kurozumi et al. ..... 310/60 MM
5,814,915 A * 9/1998 Wang ......................... 310/242

FOREIGN PATENT DOCUMENTS

JP 61121744 6/1986
JP 54069704 6/1989
JP 2-59236 12/1990

* cited by examiner

*Primary Examiner*—Dang Le
(74) *Attorney, Agent, or Firm*—McGlew and Tuttle, P.C.

(57) ABSTRACT

In the present invention, by selecting an optimum combination of plating layer materials or materials, not only the manufacturing cost of motor brush is reduced but also a plating layer having excellent characteristics is formed in a narrow width on the surface of brush base material so as to have a predetermined thickness. The present invention is formed by a brush sliding portion that slides on a motor commutator and a plate-shaped brush base material that is slender as a whole and supports the brush sliding portion. This brush sliding portion is formed by Pd plating portion formed over a predetermined length on a part in the lengthwise direction of the brush base material that supports the brush sliding portion. This Pd plating is applied on the brush base material via backing Ni plating.

12 Claims, 12 Drawing Sheets

END CAP 6

LONGITUDINAL SECTIONAL VIEW OF WHOLE MOTOR

COMMUTATOR ELEMENT PLATING CONSTRUCTION

DETAILS OF Z PORTION

LAYOUT OF COMMUTATOR ELEMENTS

NOBLE METAL PLATED COMMUTATOR ELEMENT

PRIOR ART STAMPING BY PRESSING

PRIOR ART CURVING (DEBURRING PERFORMED SIMULTANEOUSLY)

PRIOR ART SHAPE OF COMMUTATOR ELEMENT

STAMPING BY PRESSING

CHAMFERING

CURVING

SHAPE OF COMMUTATOR ELEMENT

COMMUTATING DEVICE FOR SMALL-SIZED MOTOR AND MANUFACTURING METHOD THEREFOR

BACKGROUND OF THE INVENTION

1. Field of the Invention

The present invention relates to a commutating device for a small-sized motor mainly used for driving audio and video equipment, and a manufacturing method therefor. More particularly, the present invention relates to a low-cost commutating device for a small-sized motor in which the state of contact with a commutator is stabilized and wear of a brush sliding portion and the commutator is reduced, and a manufacturing method therefor.

2. Description of the Related Art

FIG. 7 is a view typically showing an ordinary small-sized motor. FIG. 7(A) is a longitudinal sectional view of the whole, and FIG. 7(B) is a view of an end cap viewed from the motor inside. A magnet 9 is provided in a metallic casing 5. A rotor is formed by assembling a rotor magnetic pole, which is formed by a laminated core 2 on a shaft 1 and a winding 3, and a commutator 4 as a unit.

After the rotor assembled as a unit on the shaft 1 is inserted through an opening in the metallic casing 5, an end cap 6 is mounted so as to close the opening in the metallic case 5. A pair of brushes 8, 8, which are in contact with the commutator 4, are attached by a brush holder 7 made of a synthetic resin, which is installed so as to fit in a hole provided in the end cap 6. The opposite ends of the brushes 8, 8 in the lengthwise direction to the commutator contact side are respectively connected to terminals 10 taken out to the outside of the end cap 6. The brushes 8, 8 typically shown in the figure are so-called metallic brushes, and each of them has a shape of plate-shaped cantilever spring. Also, the brushes 8, 8 can be configured so that fork-shaped slits are provided in the tip end portion.

An extension of the shaft 1 is projected from the bottom of the metallic casing 5 in a state in which the end cap 6 is mounted on the metallic casing 5, by which the rotor is rotatably supported by bearings provided at the bottom of the metallic casing and on the end cap 6. At this time, the brushes, 8 are arranged so as to be in contact with the commutator 4. The electric current supplied from an external power source via the brush 8 and the commutator 4 flows in the winding 3 wound around the rotor magnetic pole, by which the motor can be rotated.

Conventionally, the brush for such a small-sized motor has been formed of a material in which a brush base material consisting generally of a Cu-based alloy is clad with an AgPd alloy. The Cu-based alloy is, for example, a CuNiZn alloy. As the brush base material, an Fe-based alloy (for example, stainless steel) can also be used besides the Cu-based alloy. FIG. 8 is a view for illustrating a general manufacturing method for a brush of the related art. As shown in FIG. 8(A), a slender tape material of AgPd (silver palladium) is prepared, and on the other hand, a groove coinciding with this tape material shape is formed in the surface of the brush base material consisting of a plate-shaped Cu-based alloy. Next, after this AgPd tape material is fitted in the groove in the Cu-based alloy surface, the brush base material is finished to a clad material on which a diffusion layer is formed by rolling or the like process. Next, many brush shapes are simultaneously stamped out by pressing from a member (AgPd clad material) formed as shown in FIG. 8(B), by which brushes are completed.

By using an AgPd alloy, which is considerably more expensive than a Cu-based alloy, limitedly in a sliding portion with respect to the commutator, the material cost of brush can be reduced. However, since the fabrication cost increases as the thickness of AgPd decreases, there is a limit in reducing the cost by decreasing the thickness of AgPd. There is also a limit in decreasing the width of AgPd (length direction of slender brush).

The AgPd clad material has a problem in that since the production yield is about 70%, the production efficiency is low, and the lead time (time from ordering to completion) is long. Also, the position of AgPd in the AgPd clad material is mainly determined by the fabrication of groove, so that the dimensional accuracy is not very high.

Usually, since comparatively thick AgPd with a thickness of 5 to 10 $\mu$m is used, there is a limit in further reducing the manufacturing cost of material cost plus fabrication cost although the AgPd clad material is used for the brush of motor.

Japanese Patent Publication No. 2-59236 has disclosed a technique for forming a brush by plating, not by a clad material. A three-layer coating is formed on the surface of a Cu-based alloy by plating. A first layer is formed by depositing any of Cr, Ni, Ni alloy, and Re to a thickness of 0.1 to 10 $\mu$m, a second layer is formed by depositing any of Rh, Pt, Pd, and Ru to a thickness of 0.1 to 10 $\mu$m, and a third layer is formed by depositing any of Au, Ag, and Au—Ag to a thickness of 0.1 to 10 $\mu$m.

Although a noble metal can be deposited thin by plating as described above, there is a limit in forming a thin plating layer considering that the motor brush is slidingly used while an electric current is caused to flow between the brush and the commutator and must keep a predetermined performance even after long-term use. Therefore, when the surface of Cu-based alloy is wholly covered with a plating layer, the material cost cannot be reduced especially when a noble metal is used for plating.

Also, a commutator element, which is used in combination with the brush device, has conventionally been formed mainly by using a cladding technique. The commutator element is formed by cladding the base material surface with a noble metal such as AgCuNi. Such a clad noble metal has a limit in decreasing the thickness thereof as described concerning the brush. Moreover, considering the brush is always in sliding contact with the surface of commutator during the motor rotation, the noble metal layer cannot simply be made thin to achieve a necessary service life.

SUMMARY OF THE INVENTION

In order to reduce the material cost of brush, it is preferable that only a commutator sliding portion, not the whole surface of a brush base material, is plated. In this case, however, if plating is performed in a narrow width (brush length direction), not in a wide range, moreover to a predetermined thickness so as to achieve predetermined brush performance, there is a danger of occurrence of peeling of plating or microcracks generated in the plating layer.

From the above-described point of view, an object of the present invention is not only to reduce the manufacturing cost of motor brush but also to form a plating layer having excellent characteristics in a narrow width on the surface of brush base material so as to have a more than predetermined thickness by selecting an optimum combination of plating layer materials or materials.

Further, another object of the present invention is to provide a commutator element configuration for a commutator used in combination with a brush formed with the aforementioned plating layer, which configuration achieves excellent characteristics when the commutator element is used in combination with a plated brush.

A commutating device for a small-sized motor in accordance with the present invention includes a brush sliding portion that slides on a motor commutator and a plate-shaped brush base material that is slender as a whole and supports the brush sliding portion. The brush sliding portion is formed by palladium Pd plating portion formed over a predetermined length on a part in the lengthwise direction of the brush base material supporting the brush sliding portion. The Pd plating is applied on the brush base material via underlying nickel Ni plating.

Also, the brush sliding portion is formed by containing carbon C in or near the surface of the Pd plating portion.

Also, each of a plurality of commutator elements constituting the motor commutator includes a commutator element sliding portion with which the brush sliding portion is in sliding contact and a commutator element base material that supports the commutator element sliding portion. The commutator element sliding portion is formed by noble metal plating portion formed over a predetermined length on a part of the commutator element base material supporting the commutator element sliding portion.

Taking the outside diameter dimension of commutator as A, a gap between the adjacent commutator elements is in the range of 0.08 A to 0.24 A.

Further, a commutating device for a small-sized motor manufactured by a manufacturing method in accordance with the present invention has a plate-shaped brush base material that is slender as a whole and supports a brush sliding portion that slides on a motor commutator. Ni plating is applied on the brush base material; the brush sliding portion is formed by depositing Pd over a predetermined length on a part in the lengthwise direction of the brush base material having been subjected to Ni plating; and then the material is punched out into a desired shape by pressing.

In the present invention, since the brush sliding portion is formed by Pd plating applied on the brush base material via underlying Ni plating, the brush sliding portion can be formed so that the thickness of noble metal in the brush sliding portion is small. Therefore, the cost is low. Further, the length of Pd plating portion in the brush length direction can also be shortened as compared with the AgPd clad material for the reason of manufacturing method. From this point of view as well, the cost can be reduced. For example, the Pd plated brush achieved a cost reduction of about 23% as compared with the conventional brush using the AgPd clad material.

Also, the Pd plated brush need not be subjected to rolling unlike the AgPd clad material, and Pd plating is performed during the time when the material has a specified plate thickness. Therefore, the accuracy of dimensions such as position and width of Pd plating is high. That is to say, necessary dimensions can be secured.

Unlike the AgPd clad material, the thickness etc. of Pd plating can be adjusted easily, and the yield is high. Therefore, the production efficiency is high, and the lead time is short, so that an inexpensive small-sized motor meeting the market requirements can be provided.

For the material that contains Zn in Cu-based alloy etc., in the case of AgPd clad material, there arises a problem in that Zn is eluted by heat treatment during the process, and microcracks are generated in the AgPd portion, or PdZn is yielded, and uneven rotation is produced. Contrarily, in the case of Pd plating, an advantage is offered that PdZn etc. are not yielded because Ni plating has been applied on the whole surface and the manufacturing process does not include a heat treatment process.

Further, it has been found that the brush device in accordance with the present invention exhibits further excellent characteristics when being combined with the noble metal plated commutator element. The noble metal layer deposited on the surface of commutator element with which the Pd plated brush is in sliding contact has a sufficient service life even if the layer is thin one formed by plating. Also, the thickness of noble metal layer is decreased by using the plating technique, by which the gap between the commutator elements is decreased, and the roundness of commutator can be improved. Therefore, the oscillation of brush is restrained, and excellent combination characteristics such as service life, follow-up property, and mechanical and electrical noise can be obtained.

Like the brush, the commutator element can be formed so that the thickness of noble metal is small by using the plating technique, so that the cost is reduced. For example, the Ag plated commutator element achieved a cost reduction of about 74% as compared with the conventional commutator element using the AgCuNi clad material.

The disclosure of Japanese Patent Application No.2004-80253 Mar. 19, 2004 including specification, drawings and claims is incorporated herein by reference in its entirety.

Figure 12A:
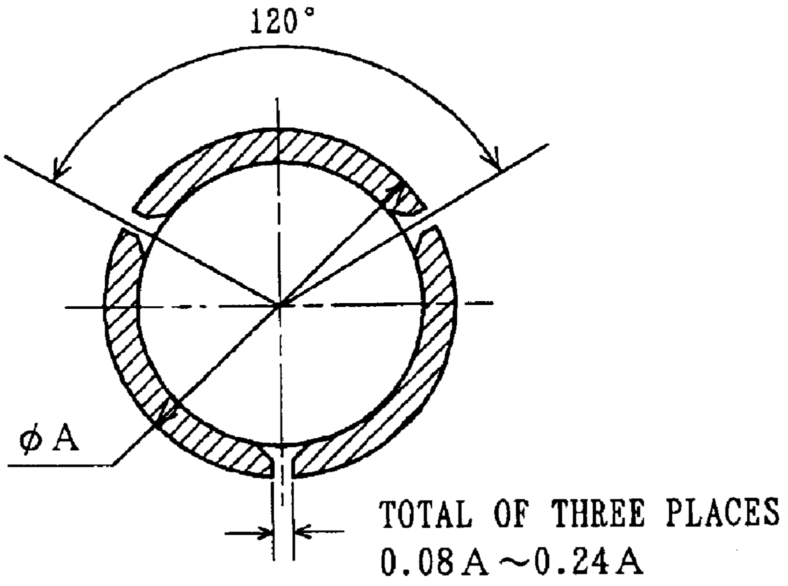
FIG. 12(A) is a view showing a commutator element configured by a noble metal plating technique, and FIG.
Figure 13:
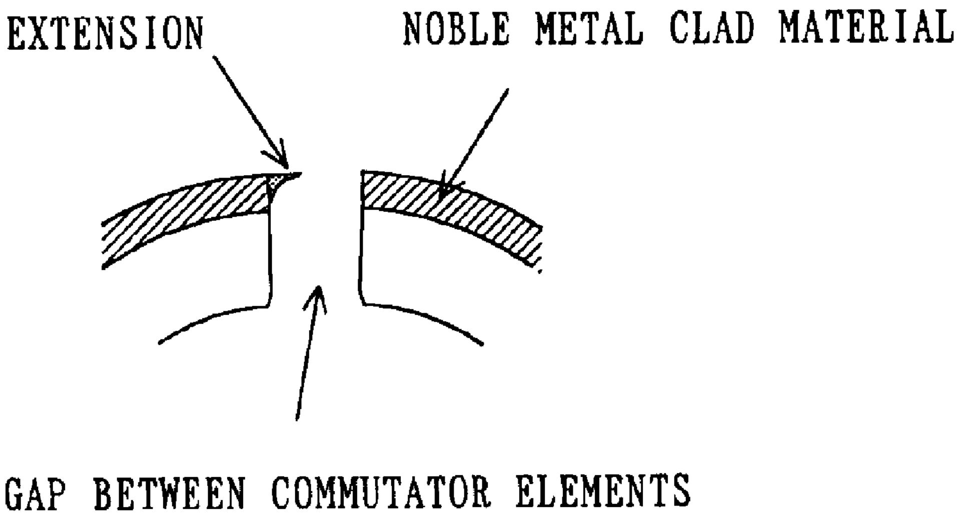
FIG. 13 PRIOR ART
Figure 14:
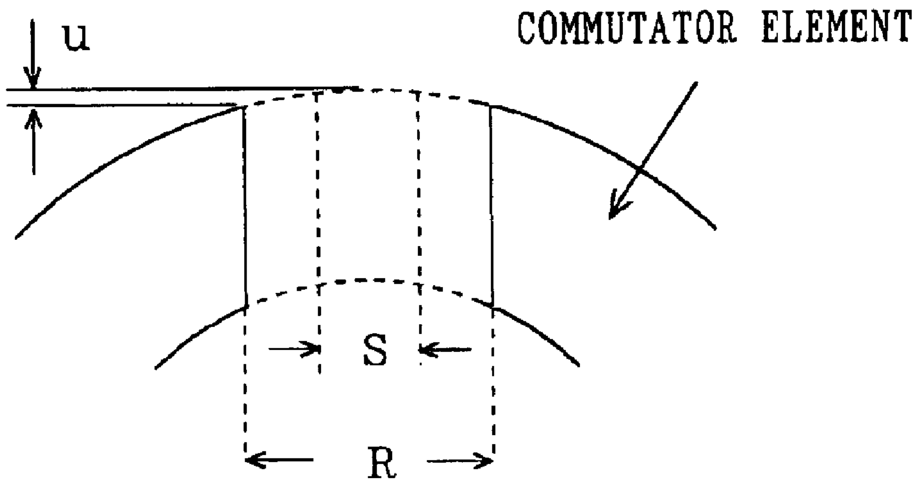
Figure 15A:
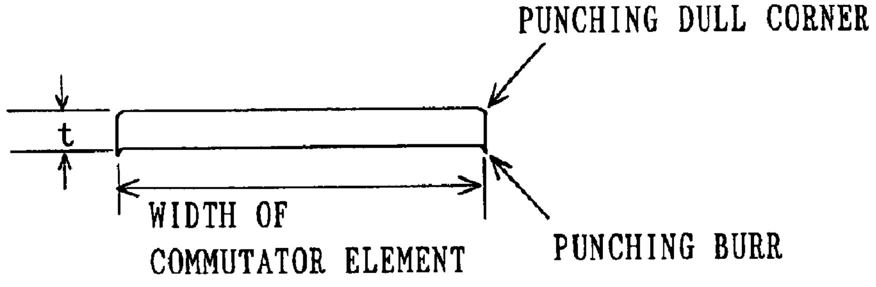
Figure 15B:
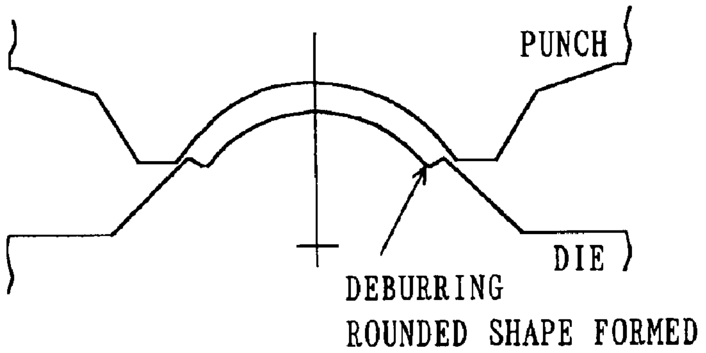
Figure 15C:
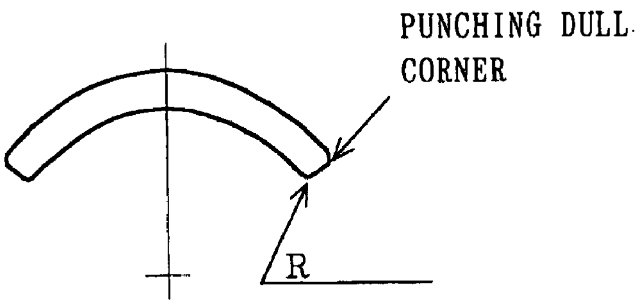
Figure 16A:
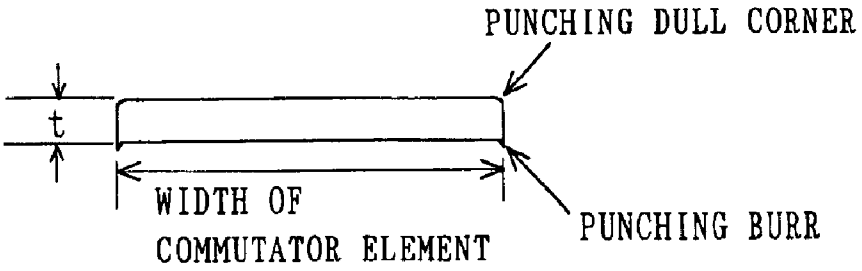
Figure 16B:
Figure 16C:
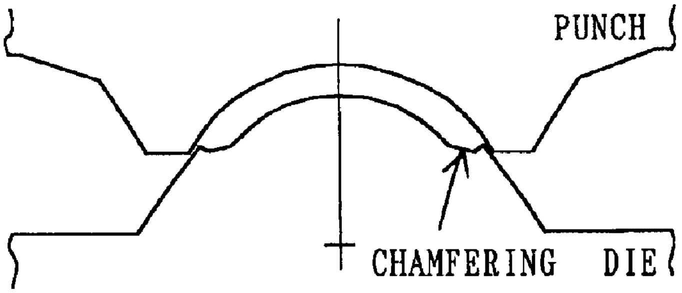
Figure 16D:
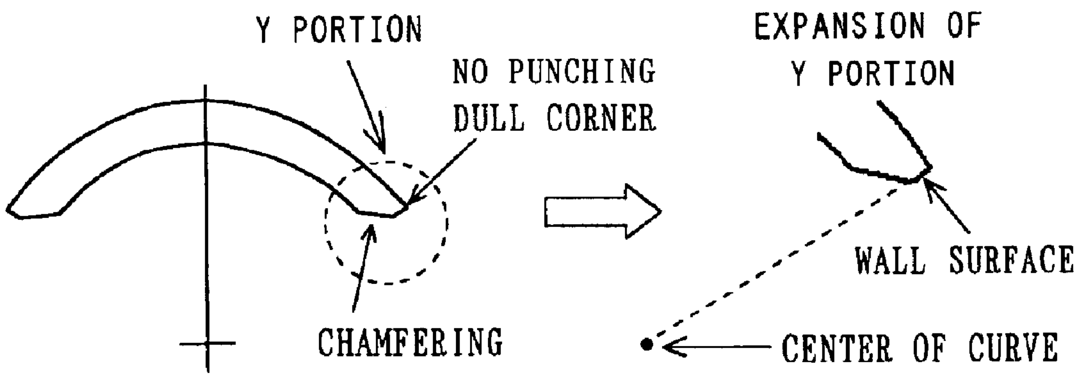
Figure 17:
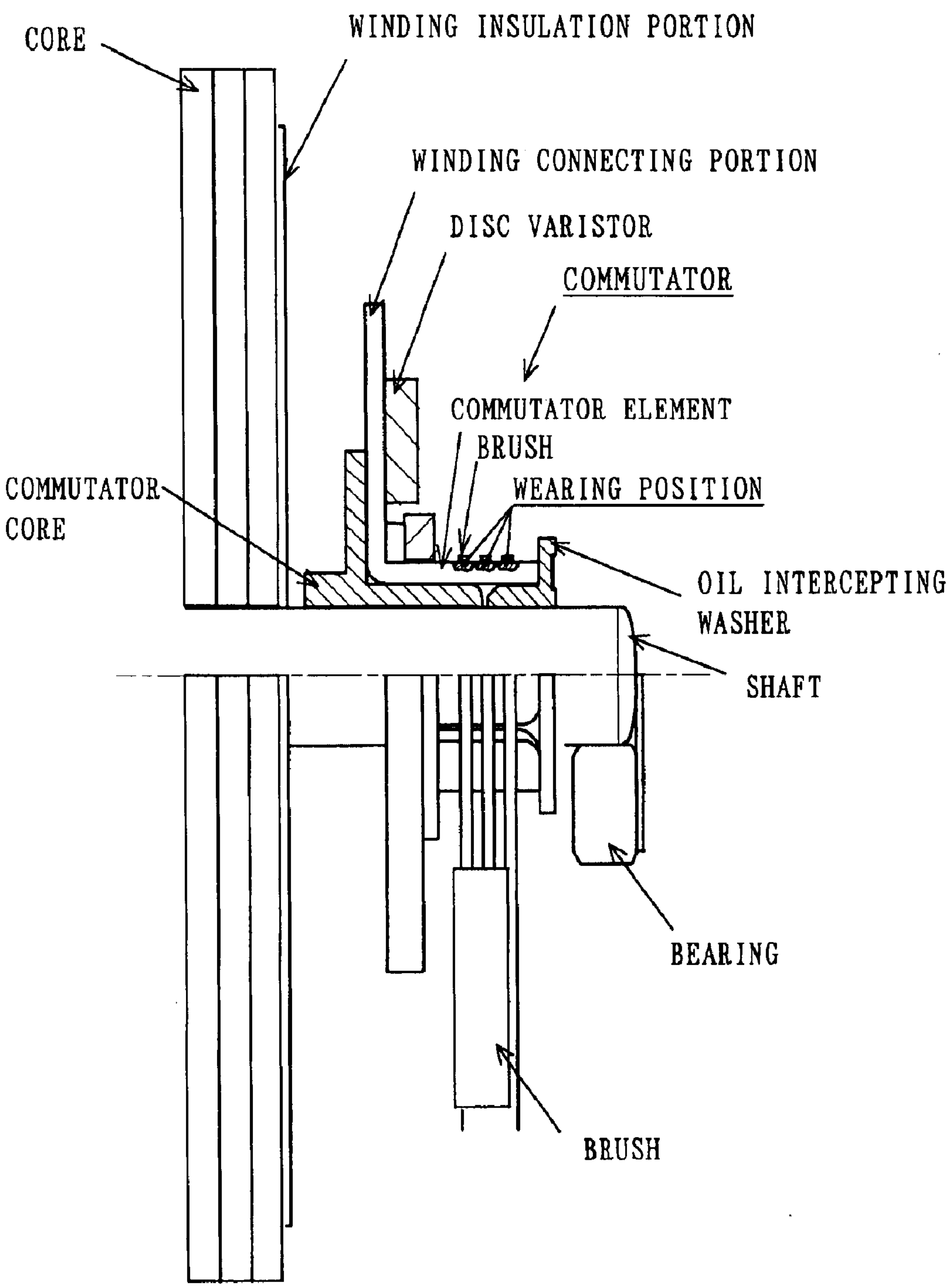

12(B) is a view showing a commutator element configured by the related art, corresponding to FIG. 12(A);

FIG. 13 is a view for illustrating an extension of noble metal produced in a case where a commutator element clad with a thick noble metal by using the related art is used;

FIG. 14 is a view for illustrating an effect achieved by narrowing a gap between commutator elements;

FIG. 15(A) through 15(C) are views for illustrating the manufacture of a commutator element of the related art;

FIG. 16(A) through 16(D) are views for illustrating the manufacture of a commutator element in which a gap between commutator elements can be narrowed; and FIG. 17 is a view for illustrating measurement of abrasion loss of a commutator element.

DETAILED DESCRIPTION OF THE PREFERRED EMBODIMENTS

Figure 1:
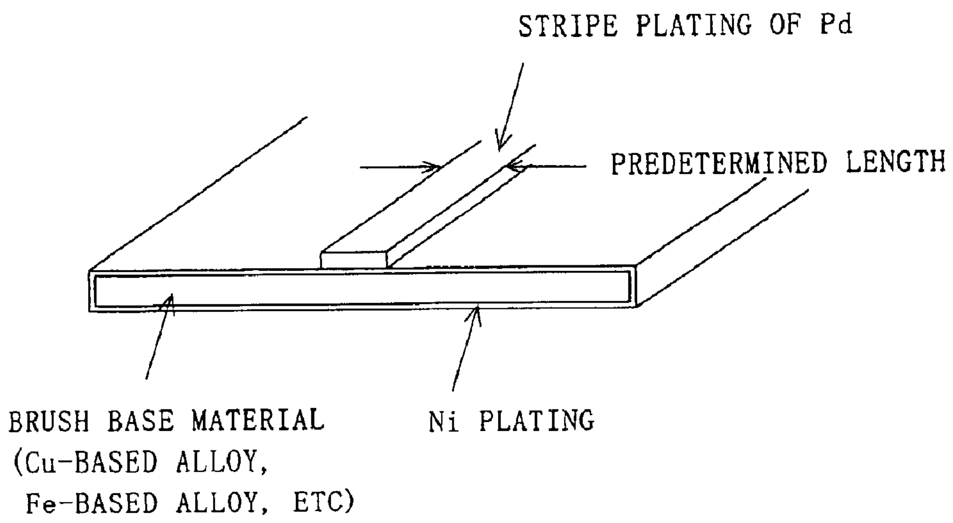
FIG. 1 is a perspective view for illustrating the manufacture of a brush embodying the present invention.

FIG. 1 is a perspective view for illustrating the manufacture of a brush embodying the present invention. As shown in FIG. 1, the whole surface of a brush base material consisting of a plate-shaped Cu (copper) based alloy is plated with a Ni (nickel) substrate. The thickness of Ni substrate is, for example, about 0.2 μm. The Ni plating is performed not only to prevent the rusting of the brush base material but also to prevent the diffusion of Pd (palladium) deposited on the brush base material.

Stripe plating of Pd with a predetermined width of, for example, 1.5 mm is applied on the Ni substrate. Pd is deposited into a stripe shape so as to have a predetermined width, and the width direction of this stripe becomes the length direction of a slender brush in a final brush device. This Pd plating portion constitutes a brush sliding portion that is in contact with a commutator. The thickness of Pd plating portion is preferably about 0.2 to 5 μm. Pd itself is excellent in terms of time change, and has stable contact resistance and other superior characteristics. However, Pd plating portion has a very high internal stress, and if the thickness of plating portion is increased, the brush base material is undesirably deformed. Also, Pd plating is high in cost. Therefore, the upper limit of the thickness of Pd plating portion is about 5 μm. Although thin Pd plating portion is advantageous in terms of cost, if the thickness of Pd plating portion is not larger than 0.2 μm, desired brush performance cannot be obtained.

This stripe plating can be performed by the ordinary method in which portions other than the plating portion is masked by using a masking tape etc., and plating is performed only at a desired position. Also, for convenience of equipment used for stripe plating, in order to prevent the discoloration of Ni, thin Pd plating of about 0.02 μm can be applied on the whole surface of Ni substrate before Pd stripe plating is performed.

Figure 5:
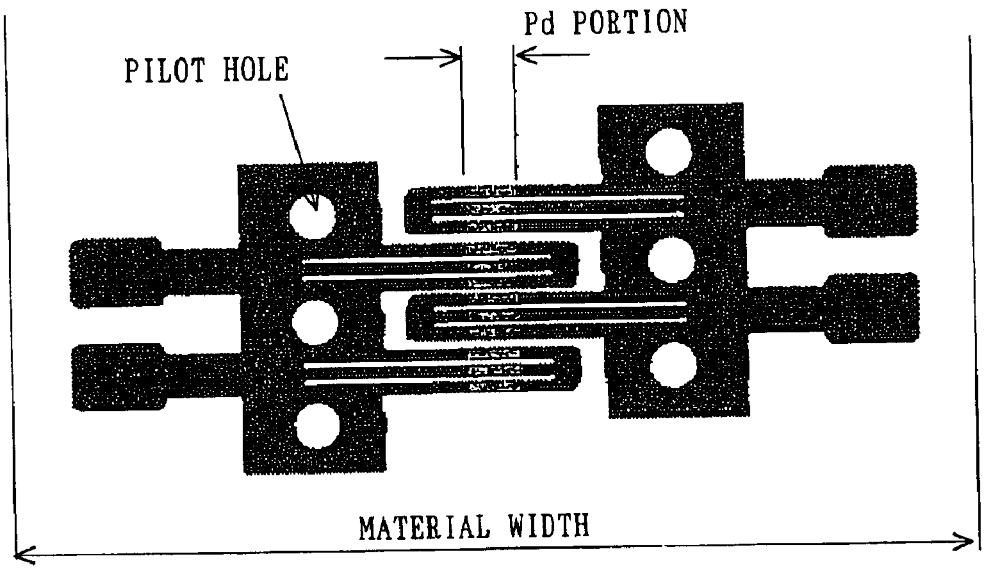
FIG. 5 is a view for illustrating a first stage of pressing at which individual brush shapes are punched out from a brush base material stripe plated with Pd.
Figure 6:
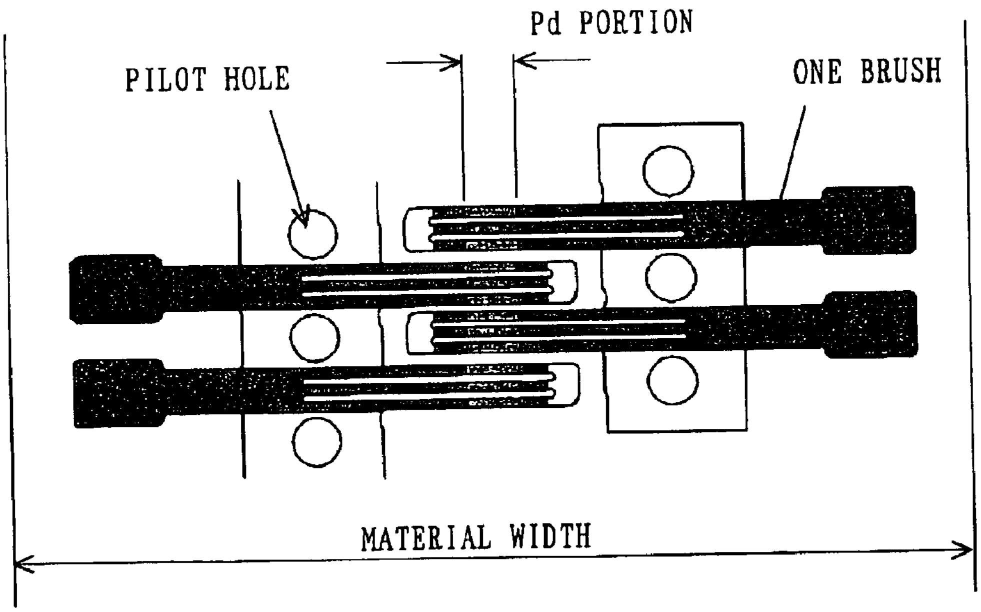
FIG. 6 is a view for illustrating a second stage of pressing following the first stage of pressing.

After the Pd stripe plating, as shown in FIGS. 5 and 6, pressing is performed to stamp out individual brushes. This pressing operation is performed at two stages. In the pressing operation of a first stage shown in FIG. 5, brushes are stamped in a state in which many brushes are connected to each other in the up-and-down direction in the figure. In the pressing operation of a second stage shown in FIG. 6, the lateral and tip-end portions of each brush are cut, by which a brush is completed. Pilot holes shown in the figures are used for feeding and positioning of material at the time of brush manufacture.

Such a pressing operation is performed in the same way as in the case of AgPd clad material of the related art. However, rolling operation that is performed in the case of AgPd clad material is not needed. Also, since the pressing operation for stamping of brushes can be performed after the Pd stripe plating, the surface roughness is satisfactory.

Figure 2A:
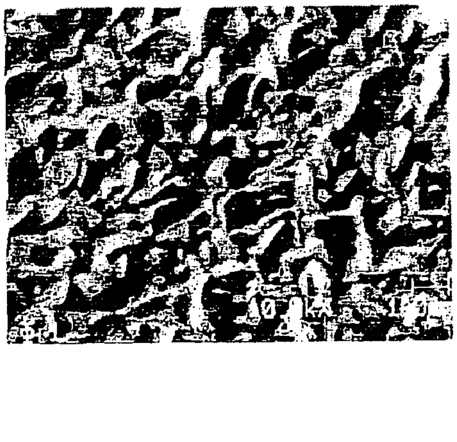
FIG. 2 is a microphotograph with a magnification of ×10,000 of a 3.0 μm-thick Pd plating surface containing C in the surface, FIG. 2(A) being a photograph showing the Pd plating surface, and FIG. 2(B) being an areal analysis photograph of image of C adhering to the surface.
Figure 2B:
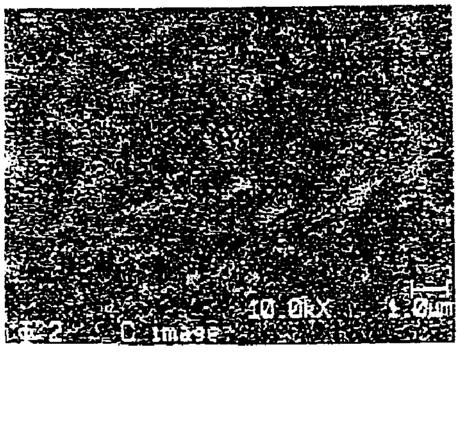
Figure 3:
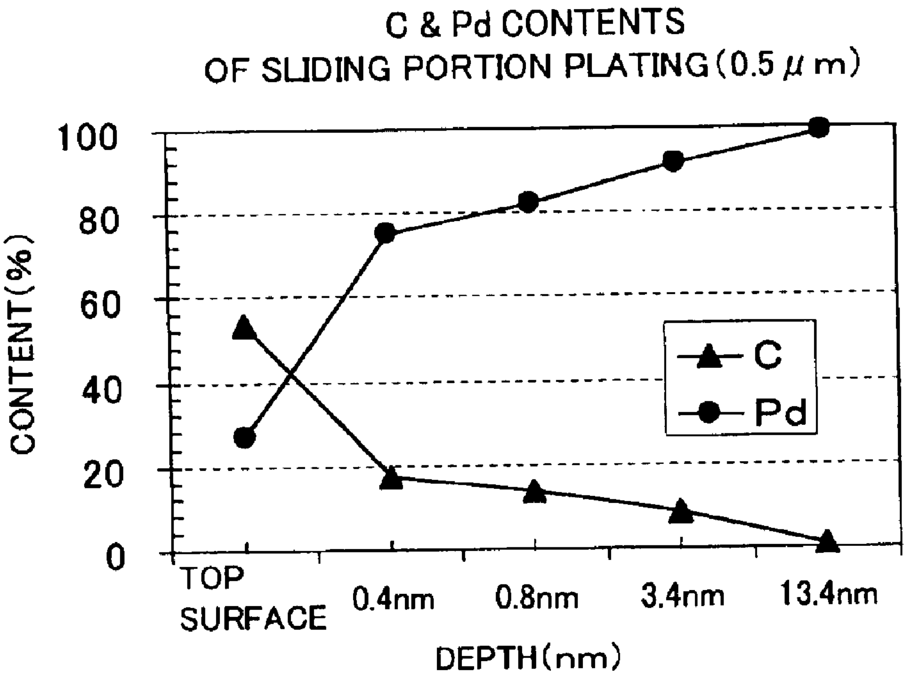
FIG. 3 is a graph showing an analysis result of plating surface in a case where the thickness of Pd plating portion is 0.5 μm.
Figure 4:
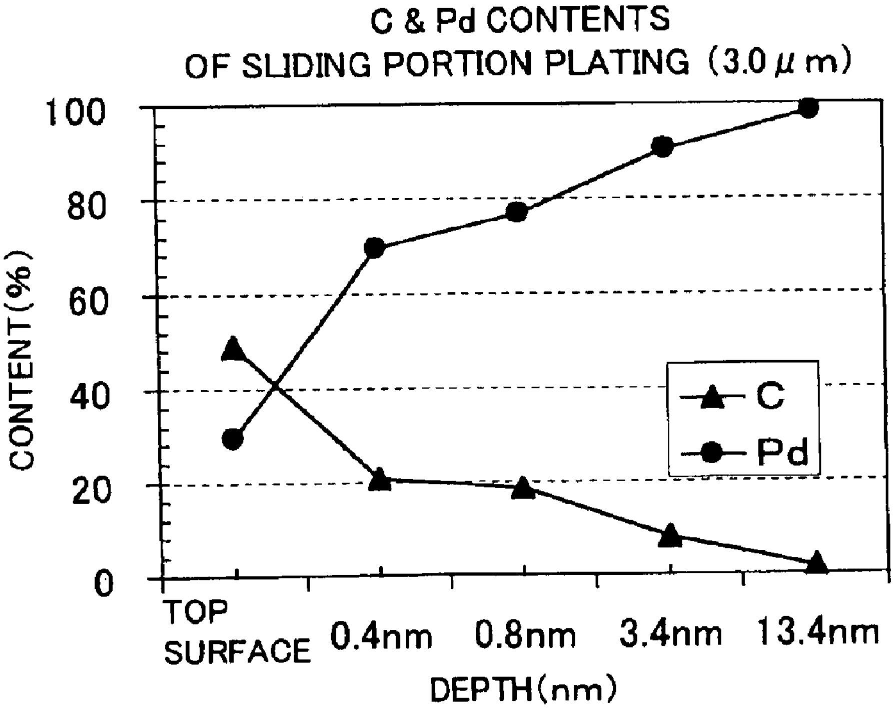
FIG. 4 is a graph showing an analysis result of plating surface in a case where the thickness of Pd plating portion is 3.0 μm.

Further, as a result of test, it has been confirmed that C (carbon) contained in the Pd plating surface exhibits excellent characteristics. FIG. 2 is a microphotograph with a magnification of ×10,000 of a 3.0 μm-thick Pd plating surface containing C in the surface. FIG. 2(A) is a photograph showing the Pd plating surface, and FIG. 2(B) is an areal analysis photograph of image of C adhering to the surface. FIGS. 3 and 4 are graphs showing analysis results of plating surface. FIG. 3 shows a case where the thickness of Pd plating portion is 0.5 μm, and FIG. 4 shows a case where the thickness of Pd plating portion is 3.0 μm. As shown in these graphs, even if the thickness of Pd plating portion differs, C is contained only in the surface and near the surface (down to a depth of about 14 nm from the top surface).

As shown in FIG. 2(A), the Pd plating surface is formed into an irregular or porous shape. Therefore, when this comes into contact with the commutator as a brush, the contact is not a plane contact but a point contact at convex portions on the irregular surface. If the brush contact portion changes from plane to point as described above, the contact pressure per unit area increases, by which the pressure of contact with the commutator as the whole brush can be decreased. Also, as seen in FIG. 2(B), the sliding resistance is decreased by carbon C contained in the Pd plating surface. Because having a low friction coefficient, carbon C has an effect of reducing the sliding resistance. Also, the brush contact pressure can be decreased by about 50% as compared with the conventional AgPd material, so that the degree of wear of the commutator decreases, and thus the thickness of noble metal of commutator can be decreased, which significantly reduces the cost.

Figure 9:
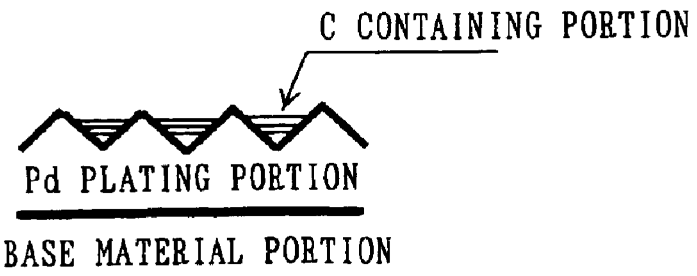
FIG. 9 is a view for illustrating a configuration of a Pd plating surface as described with reference to FIGS. 2(A) and 2(B)

Table 1 gives the result of a test for confirming the effects of carbon C contained in the Pd plating surface. FIG. 9 is a view for illustrating a configuration of the Pd plating surface as described with reference to FIGS. 2(A) and 2(B). As shown in this figure, carbon C is contained in recesses formed in the irregular Pd plating surface. In Table 1, the brush plated with Pd in this manner with C being contained is expressed as "Pd plating (containing C)". Contrarily, a brush in which carbon C is not contained in the recesses in the Pd plating surface is expressed as "Pd plating (without C)".

TABLE 1

| Sample No. | Brush follow-up rotational speed (r/min) Pd plating (containing C) | Pd plating (without C) |
|---|---|---|
| 1 | 11052 | 8973 |
| 2 | 11010 | 9117 |
| 3 | 11301 | 8029 |
| Average | 11121 | 8706 |

Figure 7B:
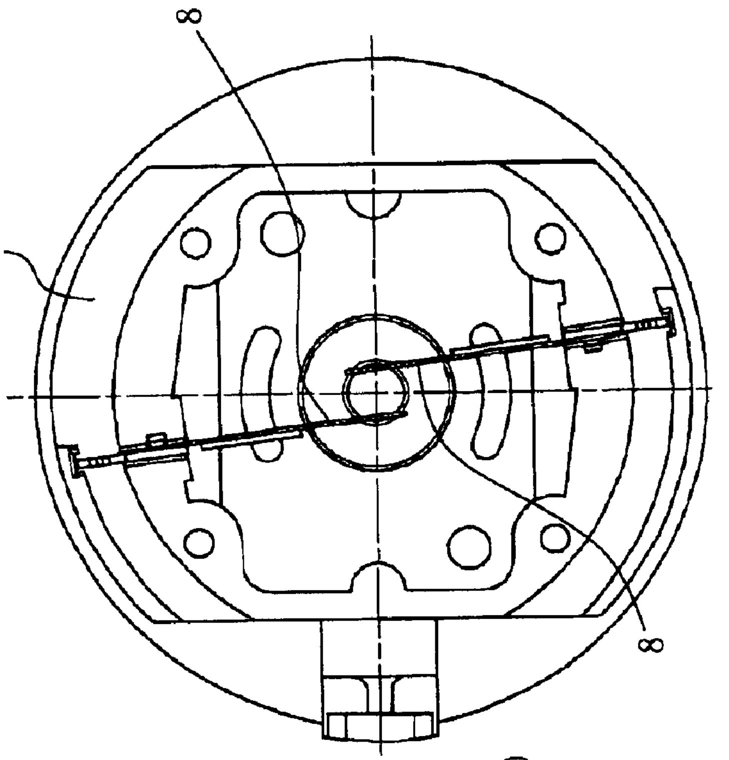
FIG. 7 is a view typically showing an ordinary small-sized motor, FIG. 7(A) being a longitudinal sectional view of the whole, and FIG. 7(B) being a view of an end cap viewed from the motor inside.
Figure 7A:
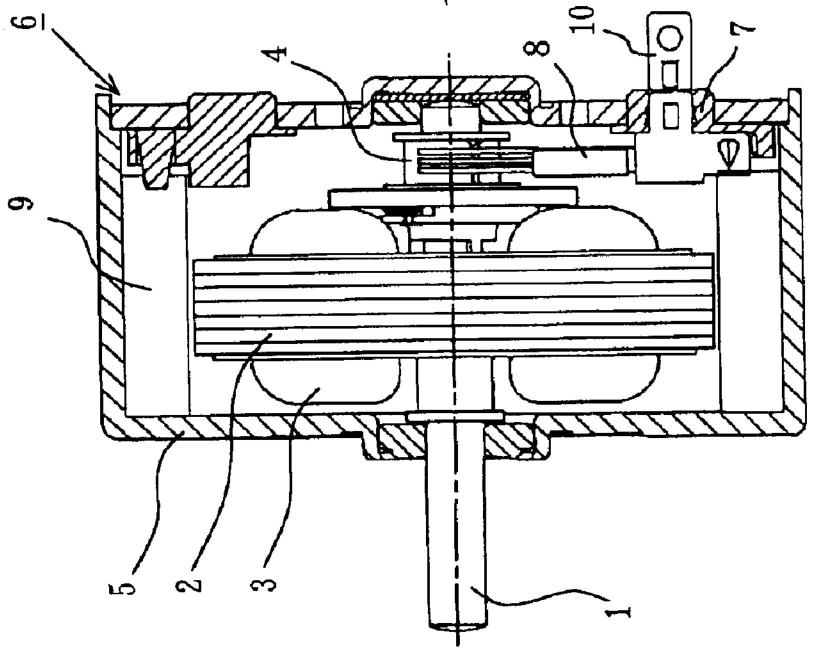
Figure 8A:
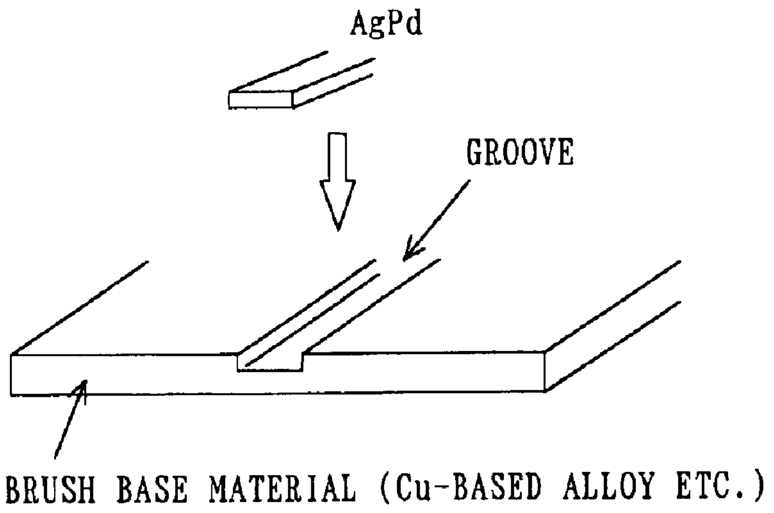
FIGS. 8(A) and 8(B) are views for illustrating the manufacture of a brush of the related art.
Figure 8B:
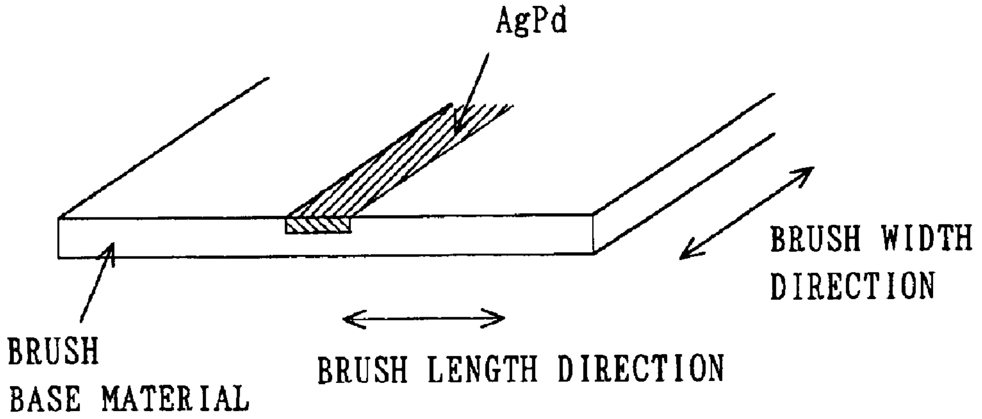

Motors were assembled using two kinds of Pd plated brushes as described above, and a brush follow-up characteristic test was conducted to examine the number of revolutions of commutator that the brush could follow up in the direction of normal rotation at no load. Since carbon C decreases the sliding resistance as described above, the test result reveals that the rotational speed in the case where carbon C is contained in the Pd plating surface is about 2000 r/min or more higher than that in the case where carbon C is not contained. Here, the "direction of normal rotation" means the direction of rotation in which the travel direction of commutator surface with respect to the brush supported in a cantilever form as explained with reference to FIG. 7 is directed from the brush support side to the tip-end side.

Next, the configuration of a commutator element that exhibits excellent characteristics when being used together with the brush device of the present invention will be described. The brush device is in sliding contact with the commutator element during motor rotation. It has been found that the brush device of the present invention exhibits much more excellent characteristics when being used together with a commutator element plated with a noble metal as described later. That is to say, it has been found that when being used together with the above-described Pd plated brush, the noble metal plated commutator element has a sufficient life as shown in the later-described test result even if the noble metal layer formed by plating on the surface of commutator element with which the brush is in sliding contact is thin.

Figure 10A:
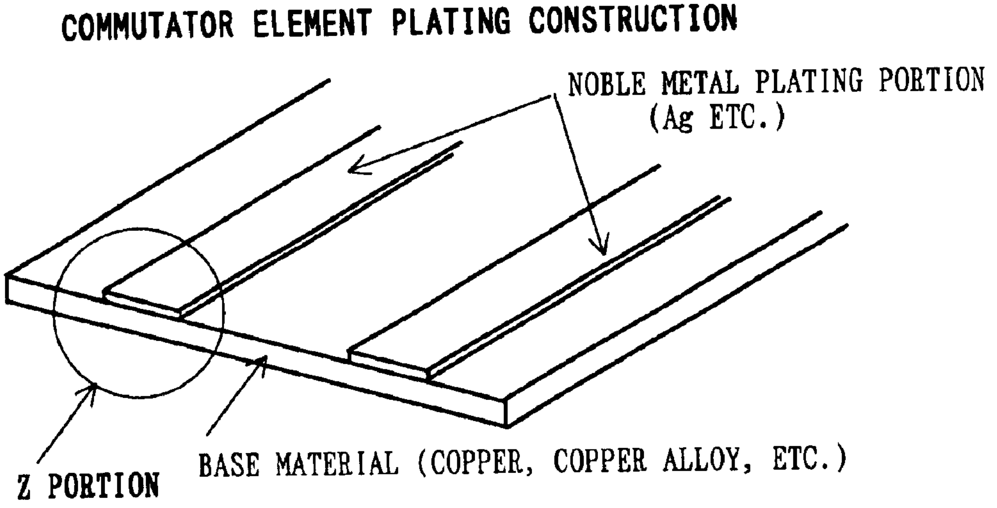
FIG. 10 is a view typically showing a commutator element plating construction, FIG. 10(A) showing a basic construction thereof, and FIG. 10(B) showing three examples showing the details of Z portion indicated by a circle in FIG. 10(A)
Figure 10B:
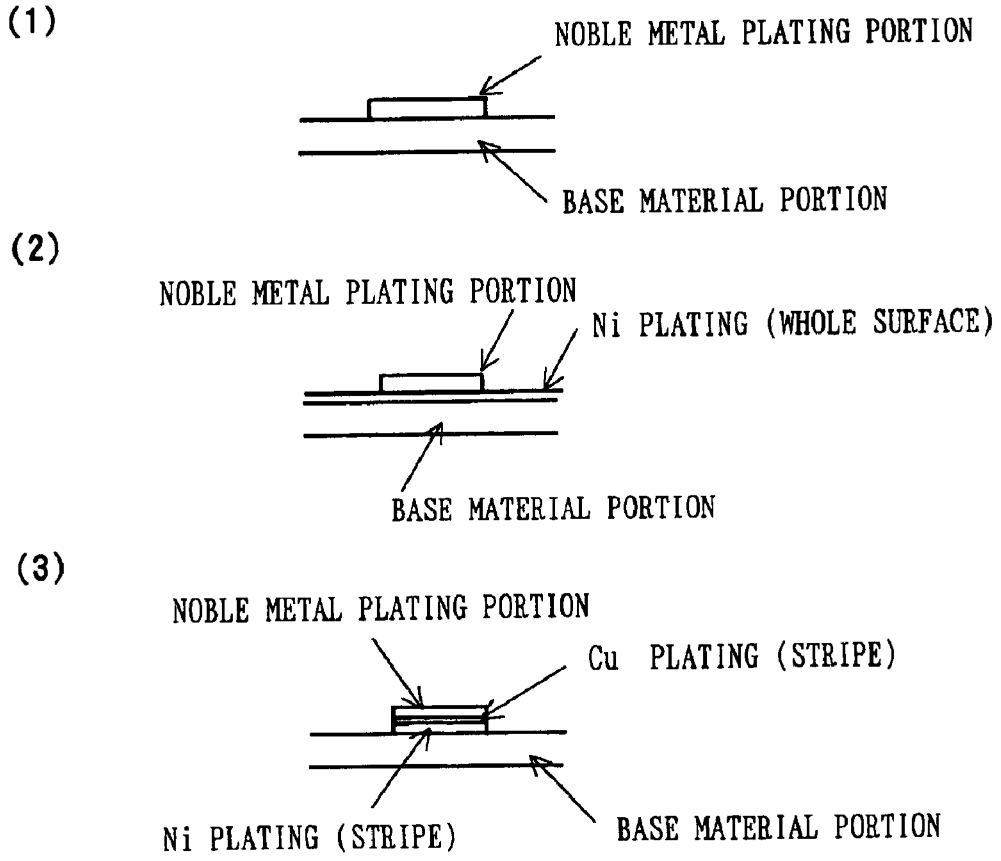

FIG. 10 is a view typically showing a commutator element plating construction. FIG. 10(A) shows a basic construction thereof, and FIG. 10(B) shows three examples showing the details of Z portion indicated by a circle in FIG. 10(A). As shown in FIG. 10(A), a plate-shaped commutator element base material consisting of copper or copper alloy is stripe plated with a noble metal. Here, for example, the thickness of base material is 0.3 μm, and the width of plating stripe is 2.2 mm. This stripe plating portion is used as a portion with which the brush is in sliding contact when the final commutator element is formed as is described later with reference to FIG. 11.

The thickness of the noble metal plating portion is preferably about 1 to 10 μm. If this thickness is too large, the cost increases, so that the upper limit of plating thickness is about 10 μm. Although the smaller thickness is advantageous in terms of cost, if the thickness is smaller than 1 μm, a desired motor service life cannot be obtained. This stripe plating can be performed by the ordinary method in which portions other than the plating portion is masked by using a masking tape etc., and plating is performed only at a desired position.

The details of this method are shown in (1) of FIG. 10(B). A plating noble metal itself is excellent in terms of time change, and has stable contact resistance and other superior characteristics. As the noble metal, for example, Ag (silver), Ag+Se (selenium), Ag+Se+Sb (antimony), Au (gold), Au+Co (cobalt), Pd (palladium), or Pd+Ni (nickel) is used. Further, the configuration can be such that after, for example, Au is plated on Ag or Pd is plated on Ag in two layers on the base material, heat treatment is accomplished to diffuse this two-layer metal. Alternatively, Sn (tin) can be plated on Ag in two layers.

Furthermore, as shown in (2) of FIG. 10(B), the noble metal plating can be performed after substrate plating such as Ni is applied on the whole surface of the base material. The thickness of Ni substrate is, for example, about 0.2 to 2.5 μm. The Ni plating is performed not only to prevent the rusting of the base material but also to prevent the diffusion of noble metal formed on the base material. Alternatively, as shown in (3), after stripe-shaped Ni plating is applied on the base material, stripe-shaped Cu plating with the same width is applied on the Ni plating, and then noble metal stripe plating with the same width can be applied on the Cu substrate.

Figure 11:
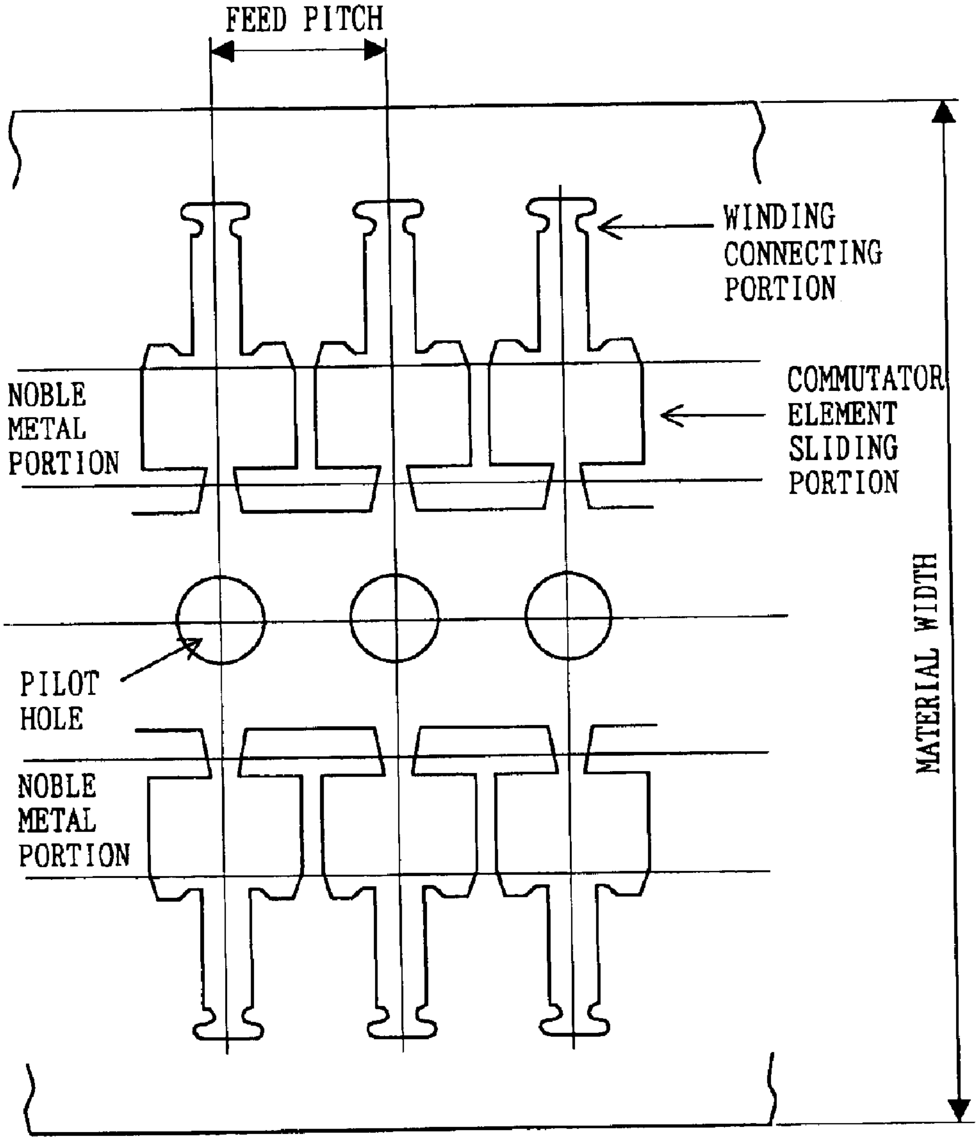
FIG. 11 is a view showing a layout of commutator elements.

FIG. 11 is a view showing a layout of commutator elements. On one sheet having noble metal plating portions on the commutator element base material as shown in FIG. 10, many commutator elements are laid out at predetermined intervals as shown in FIG. 11. This commutator element portion is stamped out by pressing as is described later with reference to FIG. 16, by which individual commutator elements are stamped out. A commutator element sliding portion shown in FIG. 11 is a portion with which the brush is in sliding contact, and this portion is plated with a noble metal. A winding connecting portion is a portion to which the end portion of winding is connected when the motor is assembled. Pilot holes are used for feeding and positioning of material at the time of pressing operation.

Figure 12B:
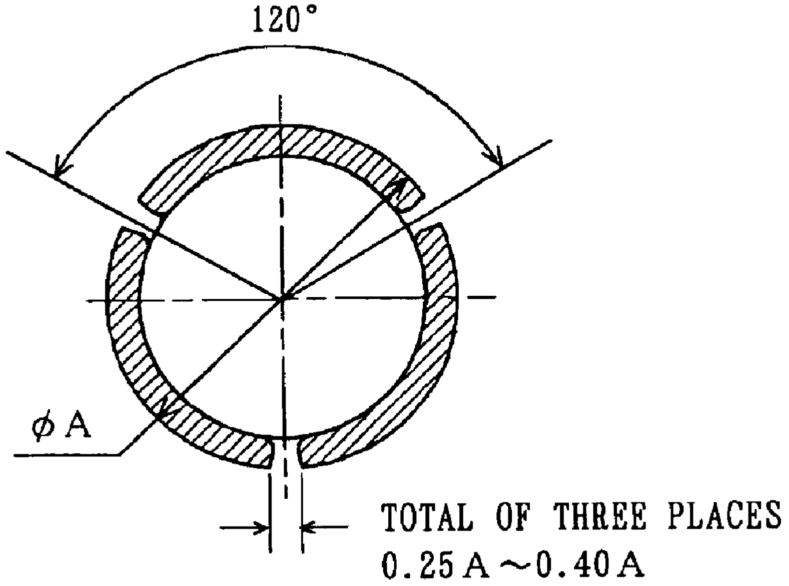
FIG. 12(B) PRIOR ART

By using the commutator element configured by the noble metal plating technique as described above, not only the thickness of plating layer can be decreased but also gaps between the adjacent commutator elements can be decreased. FIG. 12(A) is a view showing a commutator element configured by the noble metal plating technique, and FIG. 12(B) is a view showing a commutator element configured by the related art, corresponding to FIG. 12(A). As described above, the commutator element of the related art is formed by the noble metal cladding technique. The outside diameters (diameters) ϕA of these commutators are as small as 1.0 to 5.0 mm. For the commutator of the related art as shown in FIG. 12(B), a gap between the commutator elements having an outside diameter dimension ϕA is 0.25 A to 0.40 A (A is the outside diameter) in total at three places. Contrarily, for the noble metal plated commutator as shown in FIG. 12(A), the gap is as narrow as 0.08 A to 0.24 A in total at three places. More preferably, control should be carried out so that the gap is as narrow as possible considering the part fabrication accuracy and part assembly accuracy in the production technology at the present. The gap in total at three places is preferably in the range of 0.12 A to 0.20 A. If a manufacturing method, for example, as shown in FIG. 16, described later, is used, such a narrow gap between the commutator elements can be provided well. Also, the narrower gap can achieve excellent performance. However, if the gap is narrowed so as to be smaller than the lower limit value, abrasion powder produced by the sliding motion of a contact portion accumulates immediately in slits when the motor is used, so that the required service life cannot be achieved. That is to say, a short circuit is produced between the commutator elements, by which the motor is stopped. Also, if the gap between the commutator elements is widened so as to be larger than the upper limit value, characteristics such as follow-up property, electrical noise, and mechanical noise are deteriorated.

Next, the reason why the gap between the noble metal plated commutator elements can be narrowed will be explained. Although the thickness of noble metal formed on the surface of commutator element by the conventional cladding technique is usually 50 to 100 μm, the thickness of plating noble metal is 1 to 10 μm. As shown in FIG. 13, in the case of the commutator element produced by a thick noble metal clad, the noble metal elongates to the rear side in the rotation direction in the gap between the commutator elements after the motor is used for a long period of time, by which an extension is formed. If this extension produces a short circuit between the adjacent commutator elements, the commutator element does not function normally any longer. Therefore, conventionally, a gap of the degree typically shown in FIG. 12(B) has been needed between the commutator elements.

On the other hand, the use of the plating technique enables the thickness of noble metal layer to be decreased as described above. Therefore, the extension, which has posed a problem in the related art, is scarcely produced, so that the gap between the commutator elements can be narrowed to the degree shown in FIG. 12(A).

Also, the construction in which the gap between the commutator elements can be narrowed can be realized for the first time by the technique of plated brush in accordance with the present invention. When the brush slides on the surface of commutator element, abrasion powder is produced, and some of the abrasion powder intrudes into the gap between the commutator elements. If a fixed quantity of abrasion powder accumulates, there is a fear of producing a short circuit between the adjacent commutator elements. The plated brush in accordance with the present invention has an effect of decreasing the sliding resistance with respect to the commutator element as described above, so that the brush pressure can be decreased greatly as compared with the conventional clad brush. As a result, the quantity of abrasion powder produced when the brush slides on the commutator element can be decreased significantly, and a construction in which a short circuit is difficult to produce even if the gap between the commutator elements is narrowed can be provided.

FIG. 14 is a view for illustrating an effect achieved by narrowing the gap between the commutator elements. The plate-shaped brush comes into sliding contact with the rotating round-shaped commutator. At this time, if the commutator is assumed to have a complete round shape, the plate-shaped brush that is in sliding contact with the rotating commutator does not move vertically, and is in a stationary state even when the commutator rotates. Actually, however, since there is a gap between the commutator elements as shown in FIG. 4, the commutator does not have an ideal complete round shape. Therefore, the brush that is in sliding contact with the commutator moves vertically (oscillates) in the range indicated by u in the figure. In this case, if the gap between the commutator elements can be narrowed from R (corresponding to the related art) to S (corresponding to the case of noble metal plating) in the figure, the shape of commutator accordingly approaches a complete round, and consequently the range in which the brush moves vertically decreases. Although a spark is produced when the brush shifts from one commutator element to the successive commutator element, by which the commutator element is worn, the produced spark can be decreased by narrowing the range in which the brush moves. If the oscillation of brush decreases as described above, not only the service life of brush extends but also mechanical and electrical noise decreases. This fact is proven by the test result in example 3, described later.

Thus, the thickness of noble metal layer can be decreased by the noble metal plating technique, and thereby the gap between the commutator elements can further be narrowed. Therefore, excellent combination characteristics of the brush device and the commutator can be obtained.

Next, the manufacture of a commutator element capable of narrowing the gap between the commutator elements will be explained. First, the manufacture of a commutator element of the related art is explained with reference to FIG. 15. In FIG. 15(A), a commutator element material having a thickness t is punched. In this punching operation, a punching dull corner and a punching burr are inevitably formed. The dull corner means that the top corner is not cut at an acute angle and a smooth round shape is formed. At the corner on the opposite side, a beard-shaped punching burr is formed.

As shown in FIG. 15(B), the commutator element is curved by using a die and a punch each of which has the same curved shape as the shape of the completed commutator element. The die has a rounded shape at the position corresponding to the burr produced at the time of the above-described punching operation, by which the burr is collapsed. Finally, as shown in FIG. 15(C), a rounded shape (the radius is, for example, about 0.08 mm) is formed on the inside diameter side, and on the other hand, the punching dull corner on the outside diameter side remains as it is. As described above, the gap between the conventional commutator elements cannot be narrowed as explained with reference to FIG. 13, and also need not be narrowed, so that the dull corner remaining on the outside diameter side does not especially pose a problem. However, if there is a need for satisfying a requirement for narrowing the gap between the commutator elements, the punching dull corner on the outside diameter side of the commutator element cannot be left.

Next, the manufacture of a commutator element capable of narrowing the gap between the commutator elements will be explained with reference to FIG. 16. In FIG. 16(A), a commutator element material having a thickness t is punched like the related art (refer to FIG. 11). In this punching operation, a punching dull corner and a punching burr are inevitably formed. Next, as shown in FIG. 16(B), before the commutator element is curved in the next process, the corner corresponding to the punching burr is chamfered into a plane shape or a rounded shape. The chamfer amount is, for example, a half of the material thickness.

Next, as shown in FIG. 16(C), the commutator element is curved by using a die and a punch each of which has the same curved shape as the shape of the completed commutator element. The die shape is formed so that the chamfer amount is further increased (for example, about ⅔ of the material thickness) at the position corresponding to the chamfering position. Also, the die shape at the position corresponding to the punching dull corner is such that a wall surface bent sharply at right angles is formed in the direction directed from the outer periphery of commutator element toward the curve center. Thereby, when curving operation is performed by using the die and punch, a force such that the material is deformed and moved from the chamfering side to the punching dull corner side is applied. Finally, as shown in FIG. 16(D), the chamfer amount increases, and on the other hand, the punching dull corner disappears, and the wall surface bent sharply at right angles is formed in the direction directed from the outer periphery of commutator element toward the curve center. When the commutator elements without the punching dull corner are assembled as a commutator, the wall surfaces of the adjacent commutator elements are opposed to each other in parallel, so that the gap between the commutator elements can be narrowed to a desired value.

EXAMPLE 1

One example of a process for plating the brush base material of a Cu-based alloy and palladium plating conditions are as described below. By performing plating under such conditions, carbon C is contained in the Pd plating surface as explained with reference to FIGS. 2 and 3 by carbon C existing in plating solution+additive etc.

(1) Plating Process

Raw material→alkaline degreasing→washing by water→electrolytic degreasing→washing by water→10% $H_2SO_4$→washing by water→nickel plating→washing by water→palladium plating→washing by water→washing by hot water→washing by water→drying (2) Palladium Plating Conditions

TABLE 2

| Item | Numerical value |
|---|---|
| Concentration of palladium | 10 G/L |
| PH | 8 |
| Specific gravity of solution | 9° Be' |
| Temperature of solution | 50° |
| Current density | 4 A/dm$^2$ |
| Plating time | 1 min |
| Plating thickness | 1 $\mu$m |
| Plating method | Jet spray |

EXAMPLE 2

Next, test results showing excellent characteristics of the brush in accordance with the present invention is explained. Unlike AgPd, Pd has stabilized contact resistance and deteriorates less with time, so that it exhibited excellent results in the brush follow-up characteristic test, abrasion test, environmental test, life test, and measurement of commutator element abrasion loss.

The brush follow-up characteristic test is a test for examining the number of revolutions of commutator that the brush can follow up at no load. If the applied voltage is increased, the number of revolutions increases proportionally. When the number of revolutions are increased to a predetermined value, the brush breaks away from the contact with the commutator surface momentarily at the first, and when the number of revolutions is further increased, the degree of breaking-away increases. Needless to say, it is preferable that the brush do not break away from the contact until the number of revolutions reaches a higher value.

As the result of a test conducted by adjusting the brush pressure to about 1 g, whereas in the case of AgPd clad material (hereinafter referred also to as a conventional product), the brush began to break away from the contact at about 4000 revolutions/minute, the brush of the present invention followed up the commutator without breaking away from the contact until the number of revolutions exceeds 10,000 revolutions/minute.

As the brush pressure increases, the follow-up property becomes higher. Therefore, a follow-up property higher than that of the conventional product at the same brush pressure means that when almost the same follow-up property as that of the conventional product is permissible, the brush pressure can be decreased. In the present invention, the brush pressure can be decreased to about a half or less as compared with the conventional product, by which the wear of brush is restrained, and thus the brush service life and the service life of the commutator with which the brush comes into contact can be prolonged.

In the abrasion test as well, the brush of the present invention exhibited excellent characteristics. The abrasion test is a test for examining the surface condition of brush after the commutating device is operated continuously for one hour at ordinary temperature and humidity at no load at 7800 revolutions/minute by setting the brush pressure at a rather high pressure of 2 g. A wear trace caused by spark, electrical wear, and mechanical wear is produced on the brush. However, whereas the conventional product was burned by spark and discolored and a state in which the surface thereof was worn was found, for the brush of the present invention, under the same conditions, no wear trace was found although a slight sliding trace was found.

The environmental test is a test for examining the increase in contact resistance after a brush is left in environments of 85° C. and −40° C. respectively for 500 hours by using a waveform of electric current caused to flow by applying a voltage of 0.2 V. Whereas for the conventional product, the contact resistance increased slightly, for the brush of the present invention, no increase in contact resistance was found.

In the life test, for each sample, the service life (hour), the change rate of rotational speed, and change rate of current before the motor was stopped were measured under the same conditions. As the result of comparison made by making the brush pressure the same, the brush of the present invention (Pd of 1.3 $\mu$m) exhibited performance equivalent to or higher than that of the conventional product (AgPd of 8.5 $\mu$m). However, since the brush of the present invention can be used with a low brush pressure as described above, it can be said that the brush of the present invention has a longer service life than the conventional product in total.

In the measurement of commutator element abrasion loss, the abrasion loss of commutator element with which the brush was in sliding contact was measured and compared after the predetermined life test had been conducted. FIG. 17 is a view for illustrating this measurement. This figure shows a commutator section of motor, and the upper half thereof is shown by cross section. A commutator including a plurality of commutator elements arranged on a resin-made commutator core is installed in the core end portion of a shaft. A winding connecting portion configured integrally with the commutator element in the figure is a portion for connecting a winding end portion. A disc varistor installed in this portion is used to eliminate spark, and an oil intercepting washer prevents oil impregnated into a bearing from flowing to the commutator side. Two brushes typically shown so as to have a fork shape having three tip end portions are in contact with the commutator constructed as described above. By this brush in contact with the commutator, wear is brought about on the commutator after long-term use.

An abrasion loss was measured as described below. The roughness of the sliding surface of commutator in the tested motor was measured by using a Surfcoder (the measurement result is shown by a cross-sectional shape of commutator element), and from this result, an abrasion area in a cross section of commutator (a total of wear at three places corresponding to the three tip end portions of the fork-shaped brush) was determined by calculation.

Specifically, after a life test of 100,000 cycles had been conducted with the motor load being at a maximum (16.0 g·cm) and with voltages of +7 V (corresponding to about 5000 r/min)(1.5 seconds)/0 V (1.0 second)/−7 V (1.5 seconds)/0 V (1.0 second) being one cycle, an abrasion loss on the commutator element of AgCuNi material was measured. Whereas the abrasion loss caused by the conventional brush (AgPd of 8.5 $\mu$m) was 34548 $\mu$m$^2$, the abrasion loss of the brush of the present invention (Pd of 1.0 $\mu$m) was 334 $\mu$m$^2$, which was 1/100 or less of the abrasion loss of the conventional brush.

Thus, the brush of the present invention has a sufficiently long service life even if the commutator element is plated thin with noble metal because the abrasion loss of commutator element with which the brush is in sliding contact is very small.

EXAMPLE 3

Test results that showed excellent characteristics produced by narrowing the gap between the commutator elements are explained. A plurality of sample motors having a conventional standard gap (0.28 mm) and a narrow gap (0.15 mm) were prepared using a Pd plated brush described as above and a commutator with an outside diameter of 3.3 mm, which was plated with a noble metal (Ag), and were subjected to the life test at the maximum load. The result was that whereas the service life of motor having the standard gap between the commutators did not reach 15,000 cycles (about 21 hours), the service life of motor having the narrow gap between the commutators exceeded 30,000 cycles (about 42 hours), which is two times of the above-described value. Here, when the plating noble metal is worn out, the service life expires. Since wear of the plating noble metal is mainly caused by the generating spark, this life test shows that the occurrence of spark was decreased by narrowing the gap between the commutators. Also, the result of the same life test conducted at a light load showed the same tendency.

The motors prepared in the same way as described above were subjected to a mechanical noise test. The mechanical noise of motor having the narrow gap decreased as compared with the motor having the standard gap. Specifically, at a voltage of 0.7 V (700 r/min), the mechanical noise for the narrow gap was 15.8 to 16.7 dB as compared with 15.9 to 17.1 dB for the standard gap, at a voltage of 1.4 V (1400 r/min), the mechanical noise for the narrow gap was 17.9 to 18.1 dB as compared with 18.1 to 21.3 dB for the standard gap, and further at a voltage of 2.8 V (2800 r/min), the mechanical noise for the narrow gap was 20.5 to 23.5 dB as compared with 23.3 to 24.4 dB for the standard gap.

Similarly, in the result of electrical noise test conducted at no load as well, the electrical noise of motor having the narrow gap decreased as compared with the motor having the standard gap. In a line noise test in which noise is propagated on a power source line, whereas the noise of motor having the standard gap was 63.2 dB$\mu$V at an average of noise frequencies of 0.2 to 10 MHz, the noise of motor having the narrow gap decreased by about 7%, being 59.0 dB$\mu$V. In a radiation noise test in which noise is propagated in the air, whereas the noise of motor having the standard gap was 23.9 dB$\mu$V/m at an average of noise frequencies of 50 to 500 MHz, the noise of motor having the narrow gap decreased by about 9%, being 21.8 dB$\mu$V/m.

EXAMPLE 4

There is explained test results that showed that as described above, the motor performance is significantly improved by the use of the Pd plated brush, and further the performance is improved by the use of the noble metal (Ag) plated commutator element.

TABLE 3

| | Sample No. | Follow-up rotational speed (r/min) |
|---|---|---|
| (1) AgPd clad brush | 1 | 4356 |
| AgCuNi clad commutator element | 2 | 3982 |
| (2) Pd plated brush | 1 | 10331 |
| AgCuNi clad commutator element | 2 | 10206 |
| (3) Pd plated brush | 1 | 11030 |
| Ag plated commutator element | 2 | 10678 |
| (4) Pd plated brush | 1 | 11794 |
| Ag plated commutator element | 2 | 12958 |
| (narrow gap) | 3 | 13589 |
| | 4 | 13761 |

Table 3 gives the measurement result of follow-up rotational speed in the direction of normal rotation of combinations of brush and commutator element as shown in (1) to (4) with the brush pressure being set at about 1 g. Combination (1) in Table 3 uses the clad brush and clad commutator element of the related art. Contrarily, combination (2) uses the Pd plated brush, which attains a significantly improved follow-up rotational speed as compared with combination (1). Further, combination (3) applies the Ag plating technique also to the commutator element, but has the standard gap between the commutator elements. For combination (3), slight improvement is found as compared with combination (2). For combinations (1) to (3), the gap between the commutator elements was set at a standard gap of 0.86 to 1.06 mm in total of the three gaps. Contrarily, the gap between the commutator elements of combination (4) is narrowed to 0.45 to 0.6 mm. For combination (4), a significant increase in follow-up rotational speed is found as compared with combinations (2) and (3).

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A commutating device for a small-sized motor, which comprises a brush sliding portion that slides on a motor commutator and a plate-shaped brush base material that is slender as a whole and supports said brush sliding portion, wherein said brush sliding portion is formed by a palladium (Pd) plating portion formed over a predetermined length on a part in the lengthwise direction of said brush base material supporting said brush sliding portion; and said Pd plating portion is applied on said brush base material via underlying nickel Ni plating.

2. The commutating device for a small-sized motor according to claim 1, wherein said brush sliding portion is formed by disposing carbon (C) in or near the surface of said Pd plating portion to provide a surface region with C content in or near the surface of the Pd plating portion.

3. The commutating device for a small-sized motor according to claim 1, wherein each of a plurality of commutator elements constituting said motor commutator comprises a commutator element sliding portion with which said brush sliding portion is in sliding contact and a commutator element base material that supports said commutator element sliding portion, and said commutator element sliding portion is formed by noble metal plating portion formed over a predetermined length on a part of said commutator element base material supporting said commutator element sliding portion.

4. The commutating device for a small-sized motor according to claim 3, wherein taking the outside diameter dimension of commutator as A, a gap between the adjacent commutator elements is in the range of 0.08 A to 0.24 A.

5. A small-sized motor commutating device comprising:

a plate-shaped brush base material that is slender as a whole, said brush base material having a nickel (Ni) plating portion consisting essentially of Ni;

a brush sliding portion that slides on a motor commutator, said brush sliding portion consisting of a palladium (Pd) plating portion formed over a predetermined length of said brush base material that is less than a length of said brush base material, said brush base material supporting said brush sliding portion, said Pd plating portion being applied on said Ni plating portion of said brush base material.

6. The commutating device for a small-sized motor according to claim 5, wherein said brush sliding portion has carbon (C) in or near the surface of said Pd plating portion to provide a surface region with C content in or near the surface of the Pd plating portion.

7. The commutating device for a small-sized motor according to claim 6, further comprising a plurality of commutator elements constituting a motor commutator, said commutator elements each comprising a commutator element sliding portion with which said brush sliding portion is in sliding content and a commutator element base material that supports said commutator element sliding portion, and said commutator element sliding portion including a noble metal plating portion consisting essentially of a noble metal, said noble metal plating portion being formed over a predetermined length on a part of said commutator element base material.

8. The commutating device for a small-sized motor according to claim 7, wherein said commutator elements define an outside diameter dimension of said motor commutator as, said commutator elements being disposed to with a gap between adjacent said commutator elements wherein each gap is in a range of 0.08 A to 0.24 A where A is said outside diameter dimension of said motor commutator.

9. A small-sized motor commutating device formed by:

providing a plate-shaped brush base material that is slender as a whole and formed to support a brush sliding portion that slides on a motor commutator:

applying nickel Ni plating on said brush base material to provide a nickel Ni plating portion on said brush base material;

providing a brush sliding portion by depositing palladium Pd over a predetermined length on a part in the lengthwise direction of said brush base material having said Ni plating to provide a Pd plating portion;

stamping out the material into a desired shape by pressing to provide a brush element with an extension of said brush base material having said nickel Ni plating portion thereon and with said Pd plating portion extending over only a portion of said extension of said brush base material.

10. A small-sized motor commutating device according to claim 9, wherein said brush sliding portion has carbon (C) in or near the surface of said Pd plating portion to provide a surface region with C content in or near the surface of the Pd plating portion.

11. A small-sized motor commutating device according to claim 9, further comprising: a plurality of commutator elements constituting said motor commutator formed with a commutator element sliding portion with which said brush sliding portion is in sliding contact by applying noble metal plating over a predetermined length on apart of a commutator element base material noble to provide a noble metal plating portion consisting essentially of a noble metal, said noble metal plating portion being formed over a predetermined length on a part of said commutator element base material, said commutator element base material plated with said noble metal plating portion being stamped out into a shape of said commutator elements with said elements being curved.

12. A small-sized motor commutating device according to claim 9, wherein said commutator elements are formed to form a punching dull corner produced at a corner on the outside surface side of said commutator elements and a punching burr is produced at a corner on an inside surface side of said commutator elements and a corner at which the punching burr is produced is chamfered to produce a chamfered corner and said punching dull corner is eliminated a chamfering operation to provide a chamfer amount that is further increased by said elements being curved.

* * * * *